(12) United States Patent
Jensen

(10) Patent No.: US 6,523,480 B1
(45) Date of Patent: Feb. 25, 2003

(54) DRIVE SYSTEM FOR TRANSPORT SYSTEM OF THE DUAL-MODE TYPE

(76) Inventor: Palle Rasmus Jensen, Forhabningsholms Alle 30, DK-1904 Frederiksberg C (DK)

(*) Notice: Subject to any disclaimer, the term of this patent is extended or adjusted under 35 U.S.C. 154(b) by 0 days.

(21) Appl. No.: 09/719,592
(22) PCT Filed: Jun. 11, 1999
(86) PCT No.: PCT/DK99/00322
§ 371 (c)(1),
(2), (4) Date: Aug. 6, 2001
(87) PCT Pub. No.: WO99/65749
PCT Pub. Date: Dec. 23, 1999

(30) Foreign Application Priority Data
Jun. 12, 1998 (DK) .................................. 1998 00782

(51) Int. Cl.[7] .............................................. B61B 13/04
(52) U.S. Cl. ..................................... 104/118; 105/141
(58) Field of Search ................. 104/118; 105/72.2, 105/141, 137

(56) References Cited

U.S. PATENT DOCUMENTS

| | | | |
|---|---|---|---|
| 3,017,838 A | 1/1962 | Bingham | |
| 3,225,704 A * | 12/1965 | Gilvar et al. | 104/121 |
| 3,447,481 A * | 6/1969 | Gorham | 104/120 |
| 5,813,459 A | 9/1998 | Jensen | |
| 5,845,583 A | 12/1998 | Jensen | |
| 6,012,396 A * | 1/2000 | Schulz | 105/72.2 |

FOREIGN PATENT DOCUMENTS

WO   WO 9118777   12/1991

* cited by examiner

*Primary Examiner*—S. Joseph Morano
*Assistant Examiner*—Robert J. McCarry, Jr.
(74) *Attorney, Agent, or Firm*—Kilpatrick Stockton, LLP

(57) ABSTRACT

A transport system of the dual-mode type which comprises dual-mode vehicles (1) and a monorail (2), whereby said dual-mode vehicles can run both on an ordinary roadway (10) and as rail vehicles on the monorail (2). The monorail has a substantially triangular cross-sectional profile (7) with one apex of the triangle facing upwards, and the vehicles (1) each have a downwards-facing, through-going indentation (6) in the longitudinal direction with a cross-sectional profile which corresponds substantially to the cross-sectional profile (7) of the monorail (2). Each vehicle has driving wheels (8) for running on a roadway (10) and drive- and support wheels for running on the monorail (2). The vehicle has at least two drive-wheels (13a, 13b) are placed with their axes of rotation (20a, 20b) substantially vertical, and such that at least one drive-wheel (13a, 13b) for running on the monorail is placed on each side of a substantially vertical surface of the monorail (2).

9 Claims, 2 Drawing Sheets

--Prior Art--

--Prior Art--

DRIVE SYSTEM FOR TRANSPORT SYSTEM OF THE DUAL-MODE TYPE

The invention concerns a transport system of the dual-mode type comprising dual-mode vehicles and a monorail, said dual-mode vehicles being capable of running both on an ordinary roadway and as rail vehicles on the monorail. The monorail has a substantially triangular cross-sectional profile with one apex of the triangle facing upwards, and each of the vehicles has a downwards-facing, through-going indentation extending in the longitudinal direction with a cross-sectional profile which corresponds substantially to the cross-sectional profile of the monorail. Each vehicle has drive-wheels for running on the roadway and drive- and support-wheels for running on the monorail.

BACKGROUND OF THE INVENTION

From international patent application no. PCT/DK91/00146 (WO 91/18777) a transport system of the kind described in the introduction is known, where dual-mode vehicles can run on the substantially triangular rail individually or as coupled together units, and also as individual vehicles on an ordinary roadway.

With this reference, everything otherwise disclosed in the above-mentioned application forms part of the present application.

Figure 1:
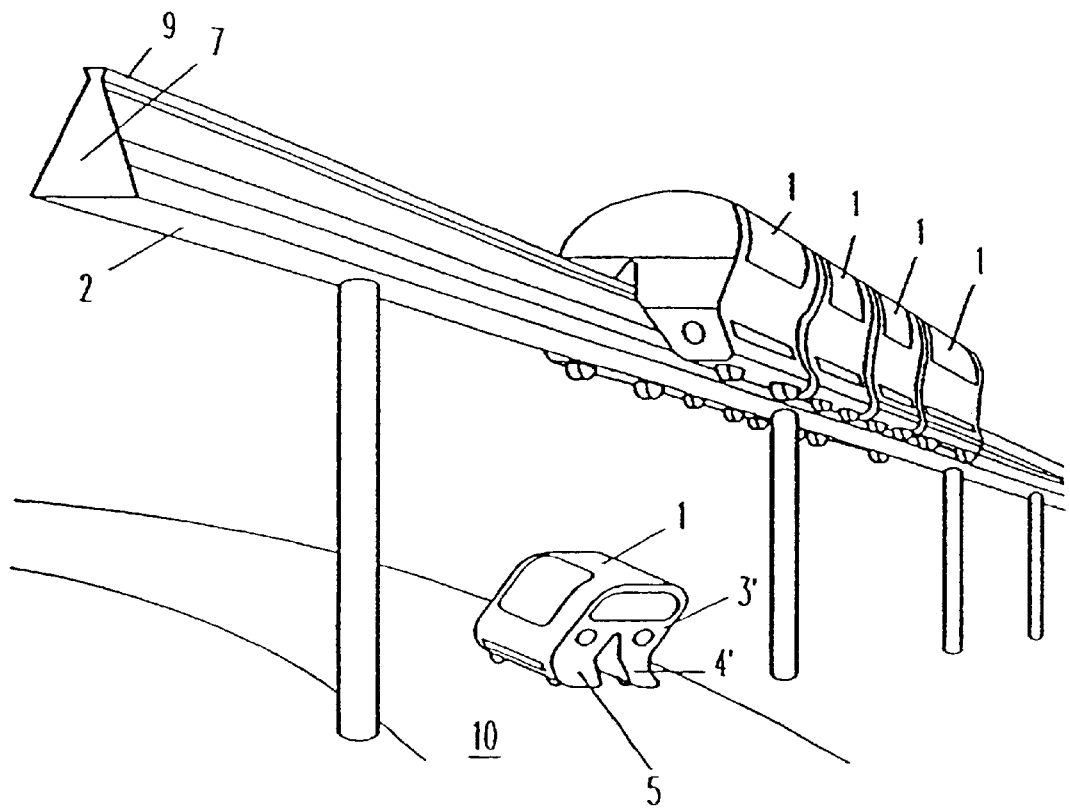
Figure 2:
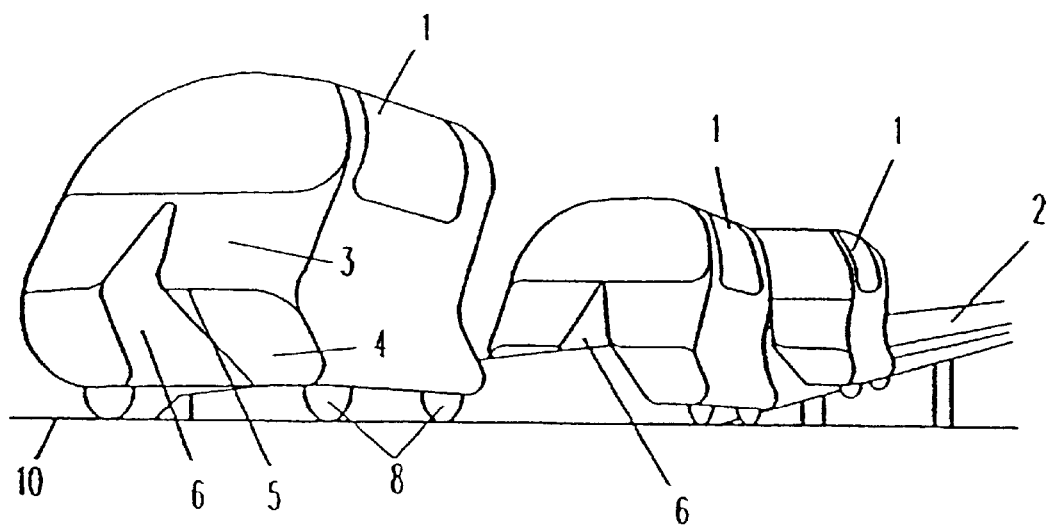

The main component in this known transport system, which transport system is also referred to as the RUF system, is the vehicle 1, which is shown in FIGS. 1 and 2 of the drawing, running either on a rail 2 with a substantially triangular cross-sectional profile 7, or on a roadway 10, in that each vehicle has ordinary drive-wheels 8 for this purpose.

Each vehicle has a front end and a rear end which are configured so that two or more vehicles can be expediently coupled together during running on the rail, and in such a manner that the aerodynamic characteristics of the vehicles are taken into consideration, both individually as well as when coupled together. For example, the vehicles shown in the above-mentioned international patent application are configured in such a way that the front end has two substantially plane surfaces 3 and 4 which meet along a horizontal line 5, and where the rear end has two substantially plane surfaces 3' and 4' which similarly meet along a horizontal line as shown and, moreover, as explained in the above-mentioned international application. Several vehicles can hereby be expediently coupled together during running on the rail, as shown in FIG. 1.

In FIG. 2 it is seen how the dual-mode vehicle 1 is transferred from running on the rail 2 out to the roadway 10 as an independent electric vehicle on wheels 8, in that the vehicle can thus be supplied with current from batteries carried by the vehicle.

The vehicle also has a downwards-facing, through-going indentation 6 in the longitudinal direction which has a cross-sectional profile corresponding substantially to the cross-sectional profile 7 of the rail.

With the prior art, the monorail is provided with a special braking-rail 9 at the top of the monorail 2, such as shown in FIG. 1, in that a braking arrangement with brake shoes (not shown) can be pressed towards this braking-rail 9. Furthermore, the vehicle of the known configuration has a driving-wheel (not shown) which generates the driving power for rail running, in that it is placed in such a manner that it transfers the propelling force to a substantially horizontal surface on top of the monorail 2. The vehicle of the known configuration also has wheels (not shown) which support the vehicle on the rail 2, in that these support wheels run on inclined side surfaces of the triangular monorail 2, and are thus arranged with their axes of rotation at an angle in relation to the horizontal.

THE ADVANTAGES OF THE INVENTION

It is the object of the invention to achieve an increase in the driving force which is transferred from the vehicle to the monorail when the vehicle is running on the rail.

As disclosed in the characterising portion of claim 1, this is achieved in that the vehicle has at least two drive-wheels for rail running, said drive-wheels being arranged with the axis of rotation substantially vertical, and such that for running on the rail at least one drive-wheel is placed on each side of a substantially vertical surface of the monorail.

At least two drive-wheels can hereby be pressed towards each other and together around the substantially vertical surfaces of the monorail, so that the friction between drive-wheel and the rail can be increased in comparison with the prior art. With the prior art, where the drive-wheel is arranged in a vertical plane so that it presses vertically down against the monorail, the friction will actually be limited, in that the friction is defined by the force of gravity. With the invention, it will be possible to increase the friction, and herewith the force which is transferred, by increasing the force with which the drive-wheels are pressed against the monorail and towards each other, and it will also be possible to adjust the pressure in accordance with the actual need. The pressure against the monorail can thus be increased when the vehicle is running upwards, accelerating and/or running with heavy loads. Correspondingly, the pressure can be reduced in stable running situations, i.e. at constant high speed and with level running, also when running downwards and/or when the speed is reduced. The friction losses are hereby minimised, in that energy is not wasted by unnecessarily high friction.

Moreover, with the invention it is possible for use to be made of substantially vertical surfaces of the monorail for propelling the vehicle, and such that problems will not arise with operational disturbances such as loss of friction in the event of ice formations and snowfall, and layers of water will not be able to lie on the drive surfaces in rainy weather.

Finally, with the invention the rail drive-wheels can be used to brake the vehicle when running on the rail, in that also here it is utilised that the friction and herewith the braking power can be adjusted. Moreover, this can be utilised with regenerative running, where electrical energy is generated in the vehicle when it is braked, in that this regenerative braking-down can be optimised by means of the adjustable friction.

It can be expedient that the substantially vertical drive surfaces, as disclosed in claim 2, be comprised of a driving rail which is placed on top of the monorail.

Moreover, as disclosed in claim 3, the vehicle can have a set of support wheels which are arranged with their axes of rotation substantially horizontal or at an acute angle in relation to the horizontal, and where the monorail has corresponding support surfaces. The vehicle will hereby be supported more effectively on the monorail than with the known arrangement, where the support wheels are arranged with their axes at an angle of around 45°–60° in relation to the horizontal. When the support surfaces are arranged in a slightly sloping manner, it is achieved that rainwater and the like can run off, and moreover a correcting effect on the vehicle is achieved, so that this is positioned correctly in relation to the centre of the monorail.

Furthermore, as disclosed in claim 3, the angle in relation to the horizontal can be varied along the monorail, so that the correcting or "self-centring" effect along the rail is varied. For example, this can be utilised in such a manner that at the beginning of a monorail, where the vehicles run up on the rail, the angle is relatively great, so that there is a great correcting effect, in that at this point it is necessary to get the vehicle positioned correctly in relation to the rail relatively quickly before the vehicle picks up speed. In connection herewith, the angle of the axes of rotation for the support wheels in relation to the horizontal can be made greater than during normal operation, when a vehicle begins to run up on a rail and during the first part of the running on the rail, so that the angle of the support surfaces and the angle of the support wheels match each other, whereby the self-correcting effect is increased. For example, this can be effected while utilising the fact that during this part of the running, the rail drive-wheels will not be in a position where they are moved towards the centre of the vehicle, but away from a driving rail's position in the vehicle. The suspension of the support wheels can thus be connected to the suspension of the rail driving-wheels in such a way that, in this situation, the support wheels will be placed with a greater angular inclination than in the normal running position, while when the rail drive-wheels are pressed in against the driving-rail in a normal running position, the support wheels will lie in the normal angular position for running on the rail.

Moreover, the monorail can be configured so that the angle of its support surfaces will be relatively great around bends and other places where there is a risk that the vehicle can be influenced away from the correct position in relation to the rail, so that also here a great self-correcting effect is achieved. In other places where the vehicle is run at constant speed and/or direction, the angle of the support surfaces can be made relatively small.

As disclosed in claim 4, the said support surfaces can expediently consist of support rails which are placed at the bottom of and on each side of the monorail.

In that the support wheels are intended to run on the rail's support surfaces, which unlike an ordinary road can not be uneven, bowed or pitted, but will be even, there will not be any need for the same degree of spring suspension as with roadway wheels. The same will apply for the rail drive-wheels. As disclosed in claim 5, it can thus be expedient to use wheel motors in the rail drive-wheels or the support wheels. The use of wheel motors, i.e. motors, especially electric motors which are built directly into the wheels, is not to be found to any great extent in connection with vehicles for running on ordinary roads, in that auxiliary motors increase the un-suspended weight of the wheels, which is a great disadvantage with wheels which, as is normal for roadway wheels, have a high degree of spring suspension. Since the rail wheels do not require any high degree of suspension, the use of auxiliary motors can thus be of advantage.

As characterised in claim 6, it can be expedient to place auxiliary motors in a support wheel or a rail drive-wheel on each side of the vehicle, in that a transfer of power is established from each support wheel to each rail drive-wheel. In a suitable manner, a suitable placing of the driving power for the rail drive-wheels is hereby achieved, while at the same time both the support wheels and the rail drive-wheels are supplied with driving power. Moreover, the vehicle can hereby be suitably arranged so that it is the support wheels which, under normal circumstances, transfer driving power to the monorail, while the rail drive wheels are in engagement with the drive-rail only in special situations, such as during acceleration or on gradients, when running up on the rail at the beginning of the rail, under heavy loads, when braking-down, when running under slippery conditions etc., so that loss of friction, wear on components and the like are limited as much a possible.

Moreover, as disclosed in claim 7, it can be expedient to provide for a transfer of power from a support wheel, which is provided with an auxiliary motor or which in itself is driven by an auxiliary motor in a rail drive-wheel, to a drive-wheel for running on roadways. In an advantageous manner, there is hereby achieved a supply of driving power to the roadway wheels while making use of the driving power for rail running which is already installed in the vehicle.

With a suitable embodiment, such as disclosed and characterised in claim 8, each of the at least two driving rail wheels can be suspended in a special support arrangement which is pivotally suspended in the opposite side of the vehicle in relation to the relevant rail drive-wheel, and in such a way that the support arrangement can be turned a greater or smaller angle between two outer positions, where the rail drive-wheel is in power-transferring contact with the drive surface on the monorail. A self-clamping effect is hereby achieved, in that the tractive power of the rail drive-wheels in combination with the reaction of the support arrangement will result in the rail drive-wheels pressing harder against the rail surfaces when tractive power is applied. Similarly, when the rail drive-wheels are used for braking, these will be pressed harder against the rail surfaces where braking power is transferred.

Since the rail drive-wheels and/or the support wheels, as mentioned earlier, run solely against completely plane and even rail surfaces, it can be expedient to use coatings of firm materials, for example hard rubber coatings, as disclosed in claim 9, instead of inflatable rubber wheels, whereby disadvantages such as puncturing etc. in connection with inflatable rubber wheels can be avoided when running on rails, thus increasing the operational security.

As characterised in claim 10, a further improvement can be obtained by configuring the rail drive-wheels and/or support wheels with driving surfaces of metal, in that the operational security is hereby increased. In this connection, the rail surfaces can be of metal or have a coating of a material with a certain flexibility. When the rail surfaces instead of the wheels are provided with e.g. a rubber coating, an increase in security is achieved, in that it will not be the user of the individual vehicle who must ensure that the rubber coatings on the wheels are intact, but the operator, who has overall responsibility for the system, who must ensure that the rail wheel function is in order, including that the rubber coatings on the rail are in place and intact.

Furthermore, with such flexible coatings, e.g. firm rubber coatings, it is possible for the friction along the drive-rail to be graduated, so that in places were good friction is required, such as on gradients and during acceleration, use can be made of a coating with a very high friction, while in places without gradients or accelerations etc. where running conditions are normally stable, use can be made of a coating with low friction, so that loss of friction during running is limited as much as possible, while at the same time optimum conditions of propulsion are achieved. In places where there is only need for low friction, a coating can possibly be dispensed with, in that the material of the metal drive rails can here constitute the driving surfaces.

Finally, with this embodiment, where there are flexible coatings on the rail surfaces, it is achieved that a possible coating of ice, e.g. in the event of ice-glazing, will be shattered by the pressure of the metal wheels against the flexible coating. Such a possible coating with ice will thus be shattered by the leading wheels of a vehicle and will trickle down, after which the rear wheels on the vehicle will roll on a clean surface.

Figure 3:
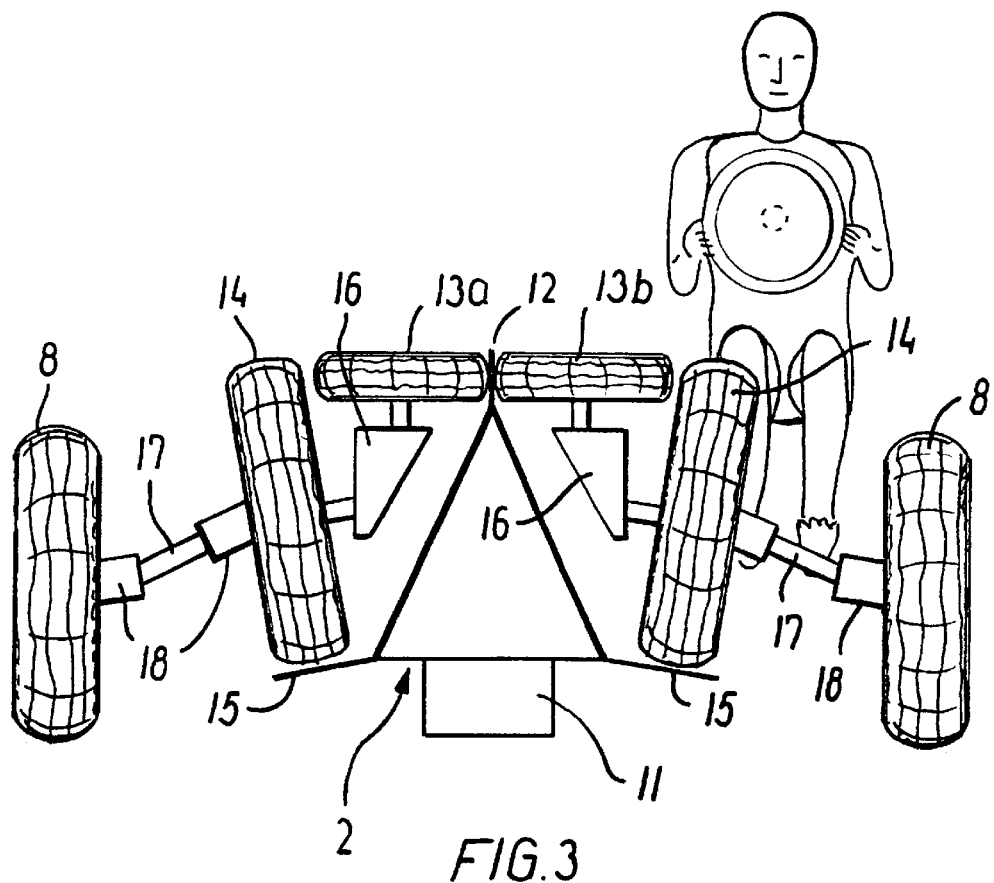
Figure 4:
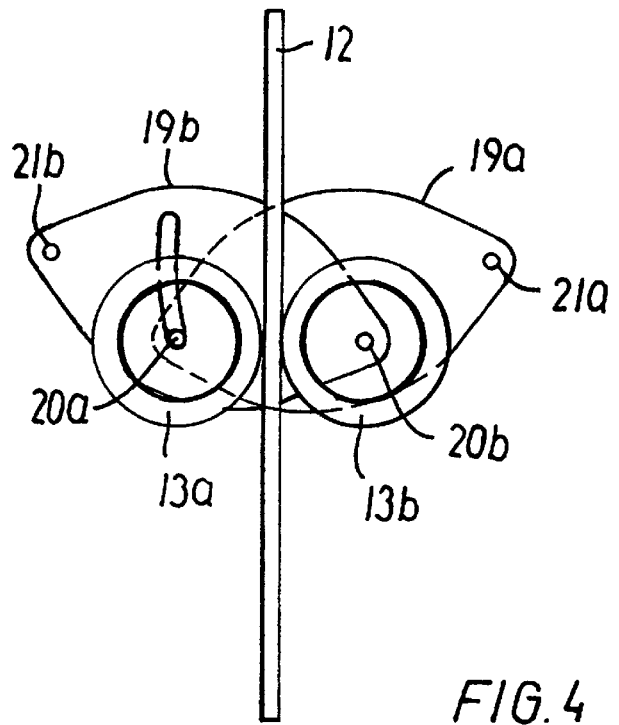

In the following, the invention will be explained in more detail with reference to the drawings, where FIG. 1 shows a known dual-mode vehicle arranged as both rail vehicle and roadway vehicle, FIG. 2 shows the vehicle shown in FIG. 1 during the transitional phase from rail running to roadway running, FIG. 3 is a sketch showing the main components forming a dual-mode transport system according to the invention, seen from the front, and FIG. 4 shows a suspension, seen from underneath, for the rail drive-wheels in an embodiment of a transport system according to the invention,

EXPLANATION OF THE EXAMPLE EMBODIMENT

FIGS. 1 and 2 of the drawing show a known dual-mode transport system of the kind explained above, and which will not be discussed further here.

In FIG. 3 the main components in an embodiment of a transport system according to the invention are sketched, in that it shows a dual-mode vehicle on a monorail 2 seen from the front. As with the prior art, the monorail 2, which is mounted on a system of columns, of which the uppermost part of a column 11 is seen, has a substantially triangular cross-section, and at its upper edge the monorail is provided with a longitudinal driving-rail 12. The vehicle's drive-wheels 13a and 13b, of which two are shown in FIG. 3, can be pressed against the substantially vertical side surfaces of the driving-rail 12. These drive-wheels are mounted in the vehicle in such a manner that there is at least one on each side of this driving rail 12, i.e. on each side of the indentation provided in the vehicle for the accommodation of the monorail 2 when the vehicle is on the monorail. The drive-wheels 13a and 13b are mounted in such a manner that their plane is substantially horizontal and their axes of rotation substantially vertical. Here, and in the remaining part of the description and in the claims, the terms "horizontal" and "vertical" are used in connection with parts of the vehicle in the sense that mention is made of the horizontal and the vertical when the vehicle is in its normal running position, i.e. in a position as shown in FIG. 3. It will be obvious that the vehicle can be in positions in which it is tilted in relation to the horizontal, e.g. when running around a bend, where the vehicle can tilt, and where the relevant parts will naturally also lie at other angles. The same will apply for the monorail 2, in that when considered expedient, for example when the rail extends in a curve, the drive-rail 12 can be placed at an angle in relation to the vertical.

Moreover, with the use of the term "substantially vertical" in connection with the side surfaces of the drive-rail 12, it is to be understood that this can, of course, involve a certain smaller inclination in relation to the absolutely vertical plane, in that for example an acute angle in relation to the vertical can be involved. Moreover, it can be thus that the side surfaces are not plane surfaces, but can e.g. be curved or composed of partially plane pieces, in that the shape involved can e.g. correspond to the contact surface of the rail drive-wheel. Similarly, as far as the rail drive-wheels are concerned, it will be understood that the axes of rotation of these are not necessarily absolutely vertical. Use is also made here of the term "substantially vertical", with which it shall be understood that the axis of rotation can have a certain smaller inclination in relation to the vertical plane, in that the axis of rotation can assume an acute angle in relation to the vertical plane.

The drive-wheels 13a and 13b with which driving power can be transferred during rail running, will thus lie approximately at right angles on the substantially vertical side surfaces of the drive-rail 12, and since there is a rail drive-wheel on each side of the drive-rail, these can be pressed together around the drive-rail 12 with a pressure required at any given situation, so that the necessary friction and tractive force can be achieved.

It is possible, however, that the pressure against the drive-rail 12 can be varied for one or more of the rail drive-wheels, for example when passing though a bend where by a synchronous operation of the rail wheels it can be expedient to ease the pressure for one or more of the rail drive-wheels. The passing through the bend can hereby be eased, and wear on the coatings etc. is reduced, in that problems in connection with the different wheels having to move over different rail lengths are thus avoided. A supplementary solution, especially in connection with relatively long rail vehicles, consists of providing the vehicles with bogey suspensions which can turn in relation to the chassis of the vehicle itself, so that the actual direction of movement of the wheels can be adjusted to the curve direction instead of having to be rigidly connected to the direction of the vehicle.

A set of support wheels 14 are provided in the vehicle on each side of the monorail 2. These wheels are shown placed in such a manner that their planes are slightly inclined in relation to the vertical out from the centre of the vehicle, i.e. so that the axes of rotation of the wheels extend at an angle in relation to the horizontal, such as shown in FIG. 3. In FIG. 3, this angle corresponds more or less to the inclination for a pair of support rails 15 which are mounted on the bottom of the monorail, said support rails 15 serving to support the vehicle and which, moreover, can be used to transfer driving power from the vehicle to the monorail. The slope of the support rails 15 can vary from place to place, in that it will be advantageous to vary this slope as will be described later.

The support wheels 14 or possibly the rail drive-wheels 13a and 13b have built-in auxiliary motors (not shown), for example alternating-current motors with permanent magnets, e.g. of the Neodyn type, which motors can be regulated very precisely. With the use of wheel motors, transmission losses are avoided and the motor's rotor can be built together with the wheel itself, so that a saving in weight and material is achieved.

From each wheel motor in the support wheels 14 or the drive-wheels 13a and 13b, a transfer of power 16 is established to/from the rail drive-wheels 13a and 13b, in that this power transfer 16 comprises e.g. a gearbox or the like, among other things in order to be able to take the angular differences between the axes for the wheels into consideration, and possibly to be able to change the speed of rotation.

From each support wheel 14 there is also a further power transfer 17 to a roadway wheel 8 which is placed in the vehicle outside the support wheels 14, and in such a way that the roadway wheels 8 hang below the support wheels 14. This power transfer 17 can for example consist of a simple transmission shaft with two universal joints 18 as shown in the example.

Auxiliary motors can thus also be arranged in the rail drive-wheels 13a and 13b, either instead of the auxiliary motors in the support wheels 14 or as a supplement to these.

In FIG. 4 a possible configuration for the suspension of the rail drive-wheels 13a and 13b seen from underneath is shown. The figure shows only the driving rail 12 with which the rail drive-wheels 13a and 13b enter into engagement, plus a fixture or support arrangement 19a and 19b for each rail drive-wheel 13a and 13b. Since what is involved here is an arrangement which is symmetrical around the driving rail 12, the conditions concerning only the one support arrangement will be described. It will be obvious that the same conditions also apply to the other support arrangement. The rail drive-wheel 13a is suspended with its axis of rotation 20a on the one end of the support arrangement 19a, which itself is pivotally suspended at the turning point 21a in the vehicle on the other side of the drive-rail 12. This turning point 21a lies at such a distance from where the driving rail is placed that the support arrangement 19a can be turned randomly between two outer positions in which the rail drive-wheel 13a is in close, i.e. power-transferring contact with the driving-rail 12 in that the rail drive-wheel in intermediate positions is either in contact with the driving-rail 12 over the whole angle of turn, or possibly moves free of this over a greater or smaller part of the turning angle. In the situation shown in FIG. 4, where the vehicle moves forwards along the monorail, i.e. downwards in FIG. 4, the support arrangement 19a will be pressed by means not shown towards the driving rail 12 in the shown position. Due to the angle which exists between the support arrangement 19a, or rather the line between the axes of rotation 20a and 21a, and the driving rail 12, an increase will occur in that force with which the rail drive-wheel 13a is pressed in against the driving rail 12 when the rail drive-wheel 13a transfers tractive power to the driving rail 12. The same will apply for the support arrangement 19b with associated rail drive-wheel 13b, so that the two shown rail drive-wheels 13a and 13b clamp together around the driving rail 12 and increase that force with which they are pressed against it, which can be said to be a self-clamping effect.

For practical reasons, the two support arrangements 19a and 19b in FIG. 4 are shown overlapping each other, in that the support arrangement 19a will lie in a plane slightly above the support arrangement 19b. Correspondingly, in the support arrangement 19b a slot is provided, a cut-out or the like, as illustrated, through which is introduced an axle or the like which is placed in the axis of rotation 20a, and which supports the rail drive-wheel 13a. By the mutual movements of the support arrangements 19a and 19b, this axle or the like will be able to move freely in the shown slot or the like. It will be obvious that these support arrangements can be configured in corresponding ways other than that shown in order to achieve the function described.

Upon a braking of the vehicle, where the two rail drive-wheels 13a and 13b must transfer a braking moment to the driving rail 12, the support arrangements 19a and 19b will be turned over into the opposite position, i.e. upwards in FIG. 4. Here, conditions corresponding to those described above will apply, so that an increase will take place in that force with which the two drive-wheels 13a and 13b are pressed against the rail 12 during the braking.

In intermediate positions of the support arrangements 19a and 19b, the rail drive-wheels 13a and 13b will only be in light contact with the driving rail, so that the wheels will continue to rotate. The system can possibly be configured so that in an intermediate position or in an angular interval, the rail drive-wheels 13a and 13b will not be in engagement with the driving rail 12, which for example can be utilised when the rail drive wheels are to be disengaged.

In the following, the function of the described embodiment will be explained in brief. When the vehicle is running on a roadway 10, only the roadway wheels 8 will be in contact with the roadway 10, and driven by an auxiliary motor in each support wheel 14 via the power transfer 17, or driven by an auxiliary motor in each rail drive-wheel 13a and 13b via the power transfers 16 and 17, these wheels will provide the driving power for the vehicle. When the vehicle is running on a monorail 2, the roadway wheels 8 will not be in contact with the monorail 2. The support wheels 14 will be in contact against the support rails 15 and transfer driving power to these rails. The rail drive-wheels 13a and 13b can be pressed against the driving rail 12 in order to transfer driving power to this rail. The auxiliary motors in each support wheel will turn the support wheels 14, which thus transfer tractive force to the support rails 15, and via the power transfer 16 will also turn the rail drive-wheels 13a and 13b, which can thus transfer tractive force to the driving rail 12. Alternatively, the auxiliary motors in each rail drive-wheel 13a and 13b will turn these and the support wheels 14 via the power transfer 16. The rail drive-wheels 13a and 13b can be arranged so that it is only under critical conditions, e.g. slippery conditions, or in special situations e.g. during acceleration, braking, on steep gradients etc. that they are pressed against the driving rail 12, so that the friction losses arising in the propulsion of the vehicle are limited.

As mentioned, the support rails 15 can be inclined in relation to the horizontal, whereby a self-centring of the vehicle on the monorail 2 is achieved. By a variation or a graduation of this inclination, the self-centring effect can be increased or reduced, which can be utilised by the transport system according to the invention. In places where there is use for a high degree of self-centring of the vehicle, for example when the vehicle has just driven up on the rail, around bends or the like, the inclination of the support rails can be relatively great, while in places where the vehicle normally runs in a stable manner, the inclination can be relatively small.

The wheels 8, 13a, 13b and 14 can be of the same diameter and rotate in a synchronous manner, whereby gearing-up and gearing-down in the transmissions are avoided so that these can be of a particularly simple configuration. Moreover, it will be achieved that at the transition from rail running to roadway running (and vice versa) there will be no difference between roadway speed and drive-wheel speed (or vice versa between drive-rail speed and rail drive-wheel speed), so that wear on the rubber coatings and unnecessary jolting are avoided. However, as illustrated in FIG. 3, use can be made of wheels of different diameters, in that here the rail drive-wheel 13a or 13b has a smaller diameter than the remaining wheels. This has the advantage that the rail drive-wheel 13a or 13b can be brought close to the support wheel 14 in the vehicle, for example immediately at the side of the wheel 14, so that the power transfer 16 between these two wheels can be relatively short, but which on the other hand must thus comprise a transmission gear. If the rail drive-wheels 13a and 13b and the support wheels 14 are configured with the same diameter, out of regard for space in the vehicle it can be necessary to place the two wheels staggered from each other, e.g. the rail drive-wheel placed in front or behind the support wheel in the vehicle's normal running direction. If use is also made of a self-clamping suspension of the kind described in connection with FIG. 4, where the rail drive-wheels 13a and 13b are suspended in such a manner that they can be moved over an area in the vehicle, it can be necessary to take this into account in the configuration of the transmission 16, for example by incorporating a knee-joint system or the like in the power transfer 16, so that the necessary freedom of movement between the two wheels can be achieved.

Use can be made of four (or more) identical sets of wheels of the kind described for each vehicle, which provides a number of advantages, among other things with regard to mass production and maintenance. Moreover, all four wheels/sets can be controlled, which among other things can be relevant in connection with larger vehicles of the dual-mode type. With the use of one motor for each set of wheels, power transfer between the two sides of the vehicle is not necessary, so that differential gears etc. are avoided.

Of the wheels described, the roadway wheels 8 are configured as normal, inflatable rubber wheels, while the rail drive-wheels 13a and 13b and the support wheels 14 can be configured as wheels with firm coatings, preferably coatings of firm rubber. However, these rail wheels can also be configured as metal wheels, possibly as wheels with a metal coating, for example a ring of metal. There can thus be advantages in making use of shock-absorbing parts within the metal coatings, for example in the form of bands of rubber under the metal coating. Such rail wheels of metal or with metal coating on the driving surface can naturally be used in connection with rail surfaces of metal.

Use can also be made, however, of rail surfaces which are coated with a material with a certain flexibility and/or friction-promoting characteristics, such as e.g. firm rubber. The monorail can herewith also be arranged in such a manner that its driving surfaces in the longitudinal direction of the rail are configured with varying friction, in that in places where a high degree of friction is required, for example on gradients, use can be made of rubber or similar material, while in places where there is not the same need for good friction, use can be made of coatings with low friction (or use can possibly be made of a rail without coating). Unnecessary friction losses are hereby avoided, while at the same time there is still an optimum friction at disposal on the rail element.

In FIG. 3, both the roadway wheels 8, the support wheels 14 and the rail drive-wheels 13a and 13b are shown as configured with contact surfaces which are profiled or with treads. It will be obvious, however, that if it is expedient out of regard for the selection of material for contact surfaces of the wheels and the characteristics of the monorail surfaces, that these wheels, and especially the support and rail drive-wheels, can instead be configured with smooth surfaces or in other suitable ways.

What is claimed is:

1. Transport system of the dual-type comprising dual-mode vehicles (1) and a monorail (2) having a substantially vertical surface (12), in that said dual-mode vehicles can run both on an ordinary roadway (10) and as rail vehicles on the monorail (2), said monorail being substantially triangular in cross-sectional profile (7) with one apex of the triangle facing upwards, and said vehicles (1) each having a downwards-facing, in the longitudinal direction, through-going indentation (6) with a cross-sectional profile corresponding substantially to the cross-sectional profile (7) of the monorail, in that each vehicle has drive-wheels (8) for running on a roadway (10) and drive- and supported wheels for running on the monorail (2), characterized in that: the vehicle has at least two drive-wheels (13a, 13b) for running on the monorail, the axes of rotation (20a, 20b) of said drive-wheels (13a, 13b) being placed vertically, and such that at least one drive-wheel (13a, 13b) for running on the monorail is placed on each side of the vertical surface (12) of the monorail (2) and in that each vehicle has a set of support wheels (14) for running on the monorail, said support wheels (14) being placed with their axes of rotation substantially horizontal or at an acute angle in relation to the horizontal.

2. Transport system according to claim 1, characterized in that the substantially vertical surface of the monorail (2) on which the drive-wheels (13a, 13b) have their effect, consists of a driving rail (12) which is placed on the top of the monorail (2).

3. Transport system according to claim 1, characterized in that the support surface of the monorail consists of support rails (15) which extend out to each side of the monorail (2) and are placed close to the bottom of said monorail (2).

4. Transport system according to claim 1, characterized in that the propulsion of the vehicle on the monorail (2) is effected by means of one or more auxiliary motors which are placed in one or more of the rail drive-wheels (13a, 13b) and/or support wheels (14) on a vehicle.

5. Transport system according to claim 4, characterized in that each vehicle (1) is configured in such a manner that an auxiliary mother is mounted in a support wheel (14) or a rail drive-wheel (13a, 13b) on each side of the vehicle, and that a power transfer (16) is established between each support wheel (14) and each corresponding rail drive-wheel (13a, 13b) which is placed on the same side of the vehicle.

6. Transport system according to claim 4, characterized in that each vehicle (1) is configured with at least one power transfer (17) from at least one support wheel (14) to a drive-wheel (8) for running on a roadway (10) with use being made of one or more universal joints (18) for each such power transfer (17).

7. Transport system according to claim 1, characterized in that at least two rail drive-wheels (13a,13b), which are placed in the vehicle (1) on each their side of the monorail, are each suspended on individual support arrangements (19a,19b), each of which are pivotally suspended on the opposite side of the monorail (2) in relation to the rail drive-wheel (13a,13b), and with at least such a distance between the support arrangement's turning point (21a,21b) and the axes of rotation (20a,20b) of the rail drive-wheels that each support arrangement (19a,19b) has two outer positions, where the rail drive-wheel (13a,13b) associated with each support arrangement (19a,19b) will lie up against the corresponding vertical surface of the driving rail (12), so that driving power and/or braking power can be transferred between rail drive-wheels (13a,13b) and the driving rail.

8. Transport system according to one or more of the claim 1, characterized in that rail drive-wheels (13a, 13b) and/or support wheels (14) have coatings of a firm material, and that the surfaces of the monorail (2) on which the rail drive-wheels (13a, 13b) and/or support wheels (14) have their effect, are metal surfaces.

9. Transport system according to one or more of the claims 1–7, characterized in that the rail drive-wheels (13a, 13b) and/or the support wheels (14) are configured at least partly of metal, so that the driving and/or the supporting surfaces of the wheels are of metal or have coatings of metal on the driving and/or supporting surfaces, and that those surfaces of the monorail (2) on which the rail drive-wheels (13a, 13b) and/or the support wheels (14) have their effect are surfaces of metal or have coatings of a metal with a certain flexibility.

\* \* \* \* \*